(12) United States Patent
Ikarashi et al.

(10) Patent No.: US 12,129,200 B2
(45) Date of Patent: Oct. 29, 2024

(54) MOLTEN GLASS CUTTING APPARATUS AND GLASS PRODUCT MANUFACTURING APPARATUS

(71) Applicant: NIHON TAISANBIN KOGYOU KABUSHIKI KAISHA, Ogaki (JP)

(72) Inventors: Mikio Ikarashi, Ogaki (JP); Toshinobu Hotta, Ogaki (JP)

(73) Assignee: NIHON TAISANBIN KOGYOU KABUSHIKI KAISHA, Gifu-ken (JP)

( * ) Notice: Subject to any disclaimer, the term of this patent is extended or adjusted under 35 U.S.C. 154(b) by 451 days.

(21) Appl. No.: 17/611,764

(22) PCT Filed: Jun. 10, 2021

(86) PCT No.: PCT/JP2021/022125
§ 371 (c)(1),
(2) Date: Nov. 16, 2021

(87) PCT Pub. No.: WO2022/249498
PCT Pub. Date: Dec. 1, 2022

(65) Prior Publication Data
US 2023/0234875 A1    Jul. 27, 2023

(30) Foreign Application Priority Data
May 25, 2021 (JP) ................................. 2021-087464

(51) Int. Cl.
*C03B 7/00* (2006.01)
*C03B 7/09* (2006.01)
(Continued)

(52) U.S. Cl.
CPC ............... *C03B 7/005* (2013.01); *C03B 7/09* (2013.01); *C03B 7/11* (2013.01); *C03B 7/12* (2013.01)

(58) Field of Classification Search
None
See application file for complete search history.

(56) References Cited

U.S. PATENT DOCUMENTS 3,130,028 A    4/1964   Seymour
2005/0268654 A1*   12/2005   Haase ....................... C03B 7/10
                                                          65/331

(Continued)

FOREIGN PATENT DOCUMENTS

CN           1169966 A     1/1998
FR           1257535 A     3/1961

(Continued)

OTHER PUBLICATIONS

JP11255521A EPO Machine Translation Retrieved Apr. 5, 2024. (Year: 2024).*

(Continued)

*Primary Examiner* — Lisa L Herring
(74) *Attorney, Agent, or Firm* — Cheng Law Group, PLLC

(57) ABSTRACT

A molten glass cutting apparatus comprises a pair of shear blades and a control unit that controls a pair of the shear blades to relatively move toward each other. The control unit controls a pair of the shear blades to relatively move so that tip parts of a pair of the shear blades overlap, and shearing force by cutting edges of a pair of the shear blade cuts molten glass extruded from an orifice formed at a bottom part of a spout. When a central part of molten glass is offset with respect to a central axis of the orifice, the control unit offsets a position of cutting by a pair of the cutting edges to a side of the central part with respect to the central axis.

13 Claims, 13 Drawing Sheets

(51) Int. Cl.
*C03B 7/11* (2006.01)
*C03B 7/12* (2006.01)

(56) References Cited

U.S. PATENT DOCUMENTS

| 2013/0000359 | A1 | | 1/2013 | Matsumoto et al. |
| 2013/0176421 | A1 | * | 7/2013 | Akaji ..................... C03B 7/005 348/92 |
| 2017/0121207 | A1 | | 5/2017 | Tanaka et al. |

FOREIGN PATENT DOCUMENTS

| JP | H07-101733 | A | | 4/1995 | |
| JP | 8-119638 | A | | 5/1996 | |
| JP | 11255521 | A | * | 9/1999 | ............... C03B 7/10 |
| JP | 2005-126276 | A | | 5/2005 | |
| JP | 4797127 | B1 | * | 10/2011 | ............. C03B 7/005 |
| JP | 2015-67484 | A | | 4/2015 | |
| JP | 2015-182947 | A | | 10/2015 | |
| JP | 2015-189593 | A | | 11/2015 | |
| WO | WO-2011/118616 | A1 | | 9/2011 | |

OTHER PUBLICATIONS

JP-4797127-B1 EPO Machine Translation Retrieved Apr. 6, 2024. (Year: 2024).*
The First Office Action for the Application No. 202180003073.4 from The State Intellectual Property Office of the People's Republic of China dated Dec. 28, 2023.
International Search Report for the Application No. PCT/JP2021/022125 mailed Aug. 10, 2021.
Written Opinion of the International Searching Authority (PCT/ISA/237) for Application No. PCT/JP2021/022125 mailed Aug. 10, 2021.

* cited by examiner

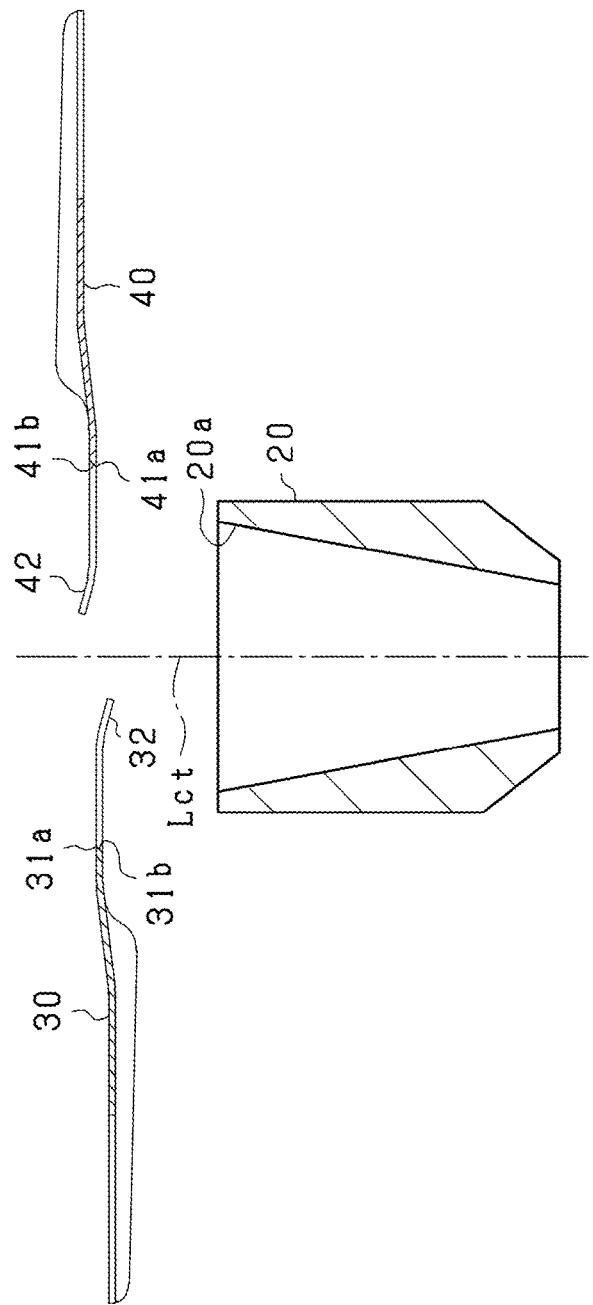
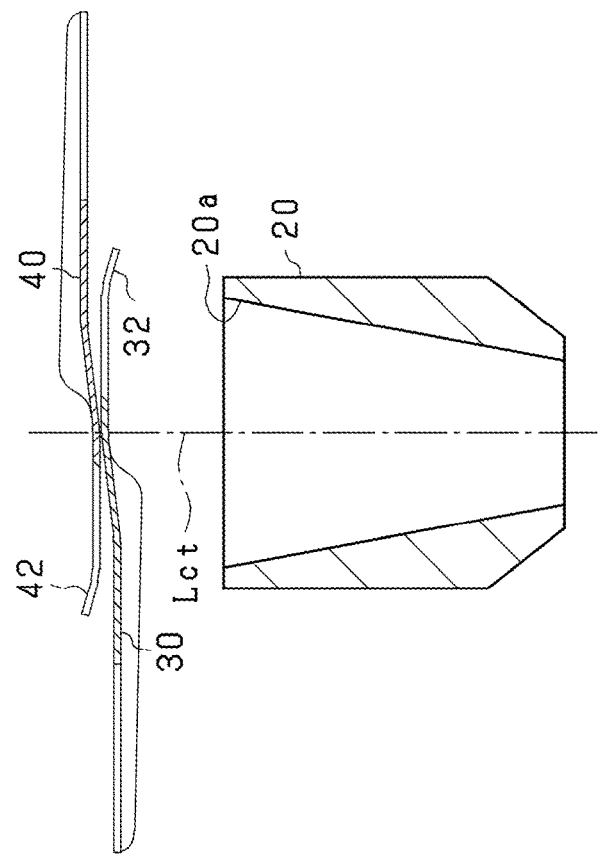
FIG. 5A
FIG. 5B

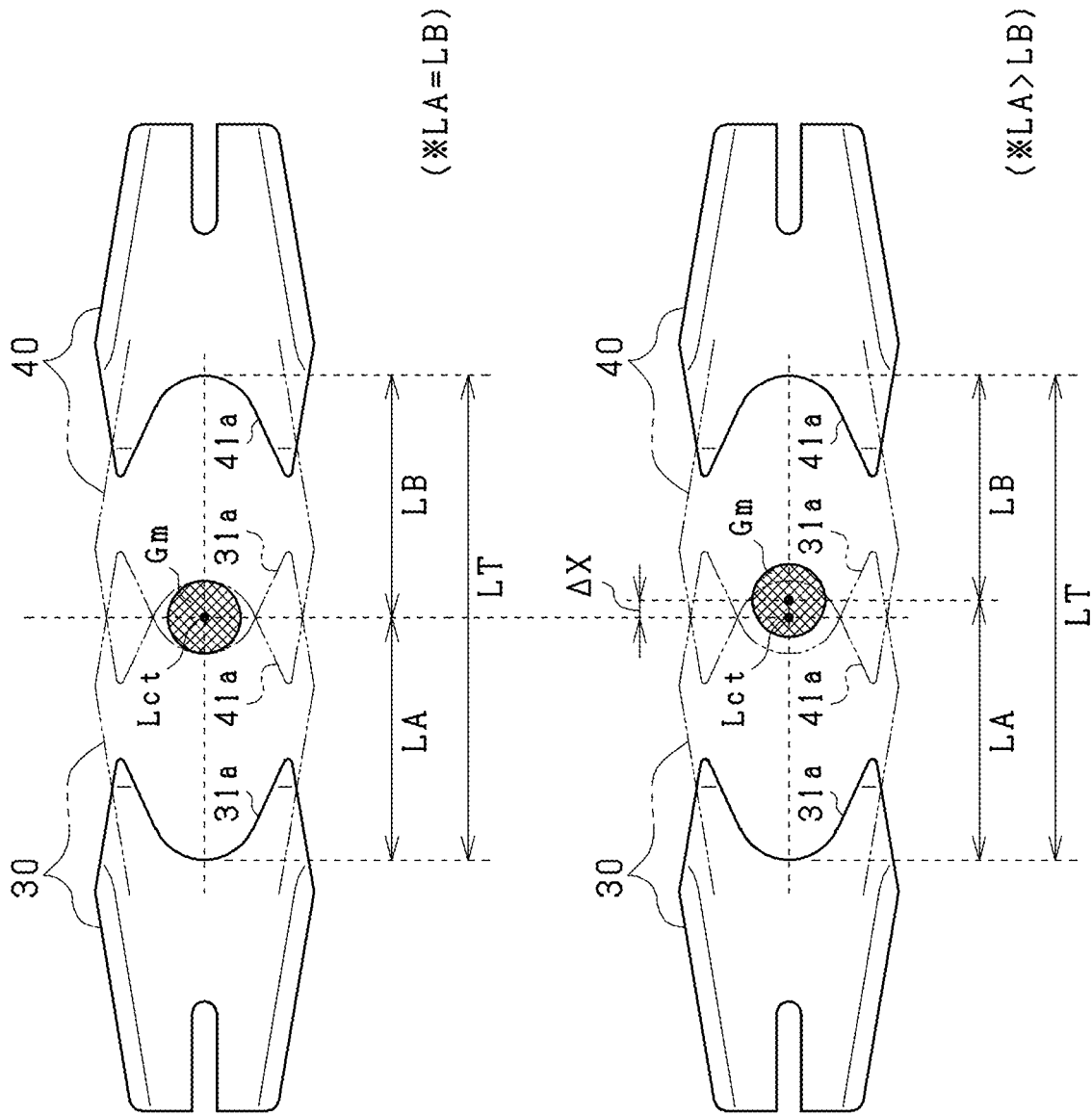

MOLTEN GLASS CUTTING APPARATUS AND GLASS PRODUCT MANUFACTURING APPARATUS

CROSS-REFERENCE TO RELATED APPLICATIONS

This application is based on Japanese Patent Application No. 2021-087464 filed on May 25, 2021, and the patent is incorporated herein in its entirety.

Technical Field

The present invention relates to a molten glass cutting apparatus and a glass product manufacturing apparatus including the apparatus.

Background Art

Conventionally, as described in Patent Literature 1, for example, there has been known a molten glass cutting apparatus including a pair of shear blades arranged below a spout, in which molten glass is stored, and above a funnel. In this apparatus, a pair of the shear blades are relatively moved toward each other, so that the tip parts of a pair of the shear blades overlap. As a result, the shearing force due to the cutting edge of a pair of the shear blades cuts the molten glass extruded from the orifice formed at the bottom part of the spout. Gobs, which are pieces of cut molten glass, are used in the manufacture of glass products such as glass containers.

CITATION LIST

Patent Literature

Patent Literature 1 Japanese Patent Laid-Open No. 2015-182947

SUMMARY OF INVENTION

Technical Problem

When the tip parts of a pair of the shear blades overlap, the cutting edges of a pair of the shear blades are brought into contact with the molten glass extruded from the orifice at the same time. This makes the cut end of the molten glass a proper cut end for manufacturing glass products. In addition, this prevents the molten glass from being greatly shaken in the moving direction of the shear blade, and prevents the drop position of the gob from deviating greatly from its proper position.

However, the central part of the molten glass at a predetermined position between being extruded from the orifice and reaching the funnel may deviate greatly from the central axis of the orifice. For example, when the temperature of the molten glass stored in the spout changes, the viscosity of the molten glass may change so that the central part of the molten glass may deviate from the central axis of the orifice. In this case, when the tip parts of a pair of the shear blades overlap, one of the cutting edges of a pair of the shear blades starts coming into contact with the molten glass at an earlier timing than the other cutting edge. As a result, the molten glass is greatly shaken in the moving direction of the shear blade. In this case, there may be a problem in which the cut end of the molten glass does not become a proper cut end for manufacturing a glass product. In addition, there may be a problem in which the drop position of the gob deviates greatly from the proper position. As described above, there is still room for improvement in the technique for cutting molten glass satisfactorily.

The present invention has been made in view of the above circumstances, and an object of the present invention is to provide a molten glass cutting apparatus capable of satisfactorily cutting molten glass, and a glass product manufacturing apparatus including the apparatus.

Solution to Problem

The present invention includes: a pair of shear blades arranged below a spout storing molten glass and above a funnel; and
a control unit that controls a pair of the shear blades to relatively move toward each other,
wherein: the control unit controls a pair of the shear blades to relatively move so that tip parts of a pair of the shear blades overlap, and shearing force by cutting edges of a pair of the shear blade cuts molten glass extruded from an orifice formed at a bottom part of the spout; and,
when a central part of molten glass at a predetermined position between being extruded from the orifice and reaching the funnel is offset with respect to a central axis of the orifice, the control unit offsets a position of cutting by a pair of the cutting edges to a side of the central part with respect to the central axis.

When the central part of the molten glass is offset with respect to the central axis of the orifice at a predetermined position between being extruded from the orifice and reaching the funnel, the control unit of the present invention offsets the position of cutting by the cutting edges of a pair of the shear blades to the central part side of the molten glass with respect to the central axis of the orifice. This can cause a pair of the cutting edges to come into contact with the molten glass at the same time to prevent the molten glass from being greatly shaken in the moving direction of the shear blade. This can prevent a problem in which the cut end of the molten glass is not a proper cut end for manufacturing glass products, or the drop position of the gob greatly deviate from the proper position.

According to the present invention even when the central part of the molten glass greatly deviates from the central axis of the orifice, the molten glass can thus be cut satisfactorily.

BRIEF DESCRIPTION OF DRAWINGS

FIG. 5A is a cross-sectional view taken along a line 5A-5A of FIG. 4A.

FIG. 5B is a cross-sectional view taken along a line 5B-5B of FIG. 4B.

FIG. 7A is a diagram showing a state in which the central position of the molten glass aligns with the central axis of the orifice.

FIG. 7B is a diagram showing a state in which the central position of the molten glass is offset from the central axis of the orifice.

DESCRIPTION OF EMBODIMENTS

First Embodiment

A first embodiment embodying a glass product manufacturing apparatus of the present invention is to be described below with reference to drawings. Note that some configurations are omitted to be shown in some drawings for convenience.

Figure 1:
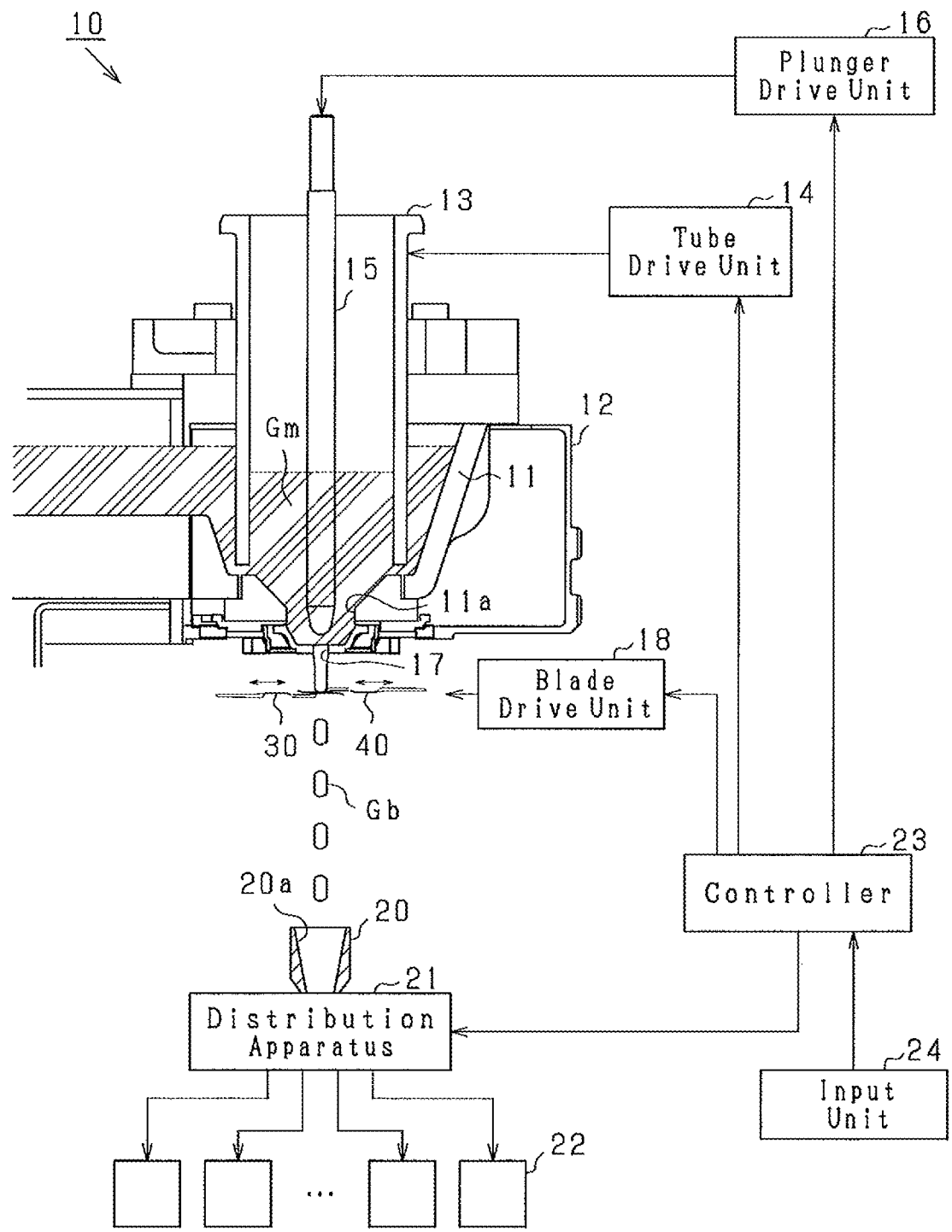
FIG. 1 is an overall configuration diagram of a glass container manufacturing apparatus according to a first embodiment.

As shown in FIG. 1, the manufacturing apparatus 10 includes a spout 11 and a spout case 12 that holds the spout 11. The spout 11 stores molten glass Gm supplied from a glass melting furnace (not shown).

The manufacturing apparatus 10 includes a clay tube 13 and a tube drive unit 14. The clay tube 13 has a tubular shape. The lower end of the clay tube 13 is immersed in the molten glass Gm in the spout 11. The clay tube 13 can be rotated around a central axis extending in the vertical direction by the tube drive unit 14. Thus, the molten glass Gm in the spout 11 is agitated. In addition, the vertical position of the clay tube 13 can be adjusted by the tube drive unit 14. The lower end part of the clay tube 13 and the bottom surface of the spout 11 form a passage for the molten glass Gm. Therefore, vertically changing the position of the clay tube 13 adjusts the amount of molten glass Gm flowing out to the outflow hole 11a side formed at the bottom part of the spout 11. A circular orifice 17 is formed at the bottom part of the spout 11. The orifice 17 is formed at a position of the bottom part of the spout 11 facing the tip part of the plunger 15 in the vertical direction.

The manufacturing apparatus 10 includes a plunger 15 and a plunger drive unit 16. The plunger drive unit 16 enables the plunger 15 to perform reciprocating motion in the vertical direction. When the plunger 15 is lowered to cause the tip part of the plunger 15 to enter the outflow hole 11a, the molten glass Gm is extruded to the outside of the spout 11 through the orifice 17. This causes the molten glass Gm to hang down in a columnar shape. On the other hand, when the plunger 15 is raised to separate the tip part of the plunger 15 from the outflow hole 11a, the hanging molten glass Gm is sucked into the orifice 17.

Figure 2:
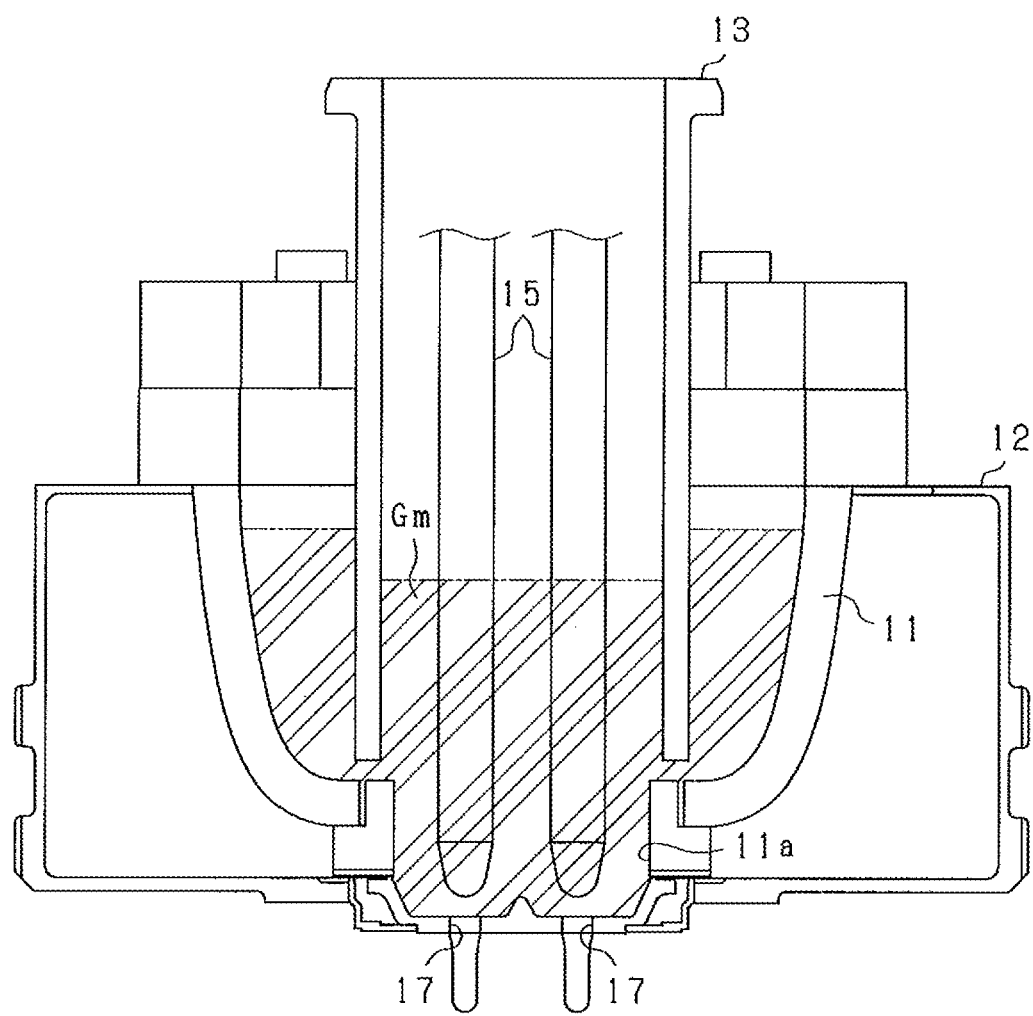
FIG. 2 is a diagram showing a spout and its peripheral configuration.

In this embodiment, as shown in FIG. 2, the manufacturing apparatus 10 includes a plurality of plungers 15. Therefore, orifices 17 corresponding to the respective plungers 15 are formed in a row at the bottom part of the spout 11. In this embodiment, the two plungers 15 are provided, so that two orifices 17 are formed at the bottom part of the spout 11.

The manufacturing apparatus 10 includes a molten glass cutting apparatus. As shown in FIG. 1, the molten glass cutting apparatus includes a first shear blade 30, a second shear blade 40, and a blade drive unit 18. The first and second shear blades 30 and 40 are arranged below the orifice 17. There are two sets of the first and second shear blades 30 and 40 provided corresponding to respective orifices 17.

The first shear blade 30 is arranged so as to face the second shear blade 40 in the horizontal direction. The blade drive unit 18 enables the first shear blade 30 and the second shear blade 40 to perform reciprocating motion in the horizontal direction in synchronization with the vertical motion of the plunger 15. The molten glass Gm extruded from the orifice 17 is cut by the shearing force between the cutting edge of the first shear blade 30 and the cutting edge of the second shear blade 40. The cut molten glass Gm becomes a columnar gob Gb and falls due to gravity.

The manufacturing apparatus 10 includes a funnel 20, a distribution apparatus 21, and a plurality of molds 22. The funnel 20 is individually provided corresponding to each orifice 17 and is arranged below each orifice 17. Specifically, the funnel 20 is formed with a through hole extending in the vertical direction. The inner peripheral surface of the through hole is formed to be an inclined surface 20a having a downward slope. In other words, the cross-sectional area of the through hole becomes smaller toward the lower opening. The cross-sectional area of the lower opening is greater than the cross-sectional area of the gob Gb. In this embodiment, the central axis of the orifice 17 aligns with the central axis of the through hole of the funnel 20. Therefore, the gob Gb can pass through the lower opening without falling on the inclined surface 20a.

There is a distribution apparatus 21 provided below each funnel 20. The distribution apparatus 21 is individually provided corresponding to each funnel 20. The gobs Gb that have fallen from the lower opening of the funnel 20 are supplied to the inlet of the distribution apparatus 21. The distribution apparatus 21 sequentially distributes the gobs Gb that have fallen from the lower opening to each of the plurality of molds 22 at a predetermined cycle. In each mold 22, glass containers such as bottles are formed using the gobs Gb.

The manufacturing apparatus 10 includes a controller 23 as a control unit. The controller 23 includes a microcomputer, a memory, and the like, and controls the operation of the tube drive unit 14, the plunger drive unit 16, the blade drive unit 18, and the distribution apparatus 21.

The manufacturing apparatus 10 includes an input unit 24. The input unit 24 is configured such that an operator can input various information. For example, the input unit 24 includes a touch panel so that the operator input various information by operating the touch panel. The information input by the input unit 24 is transmitted to the controller 23.

Figure 3:
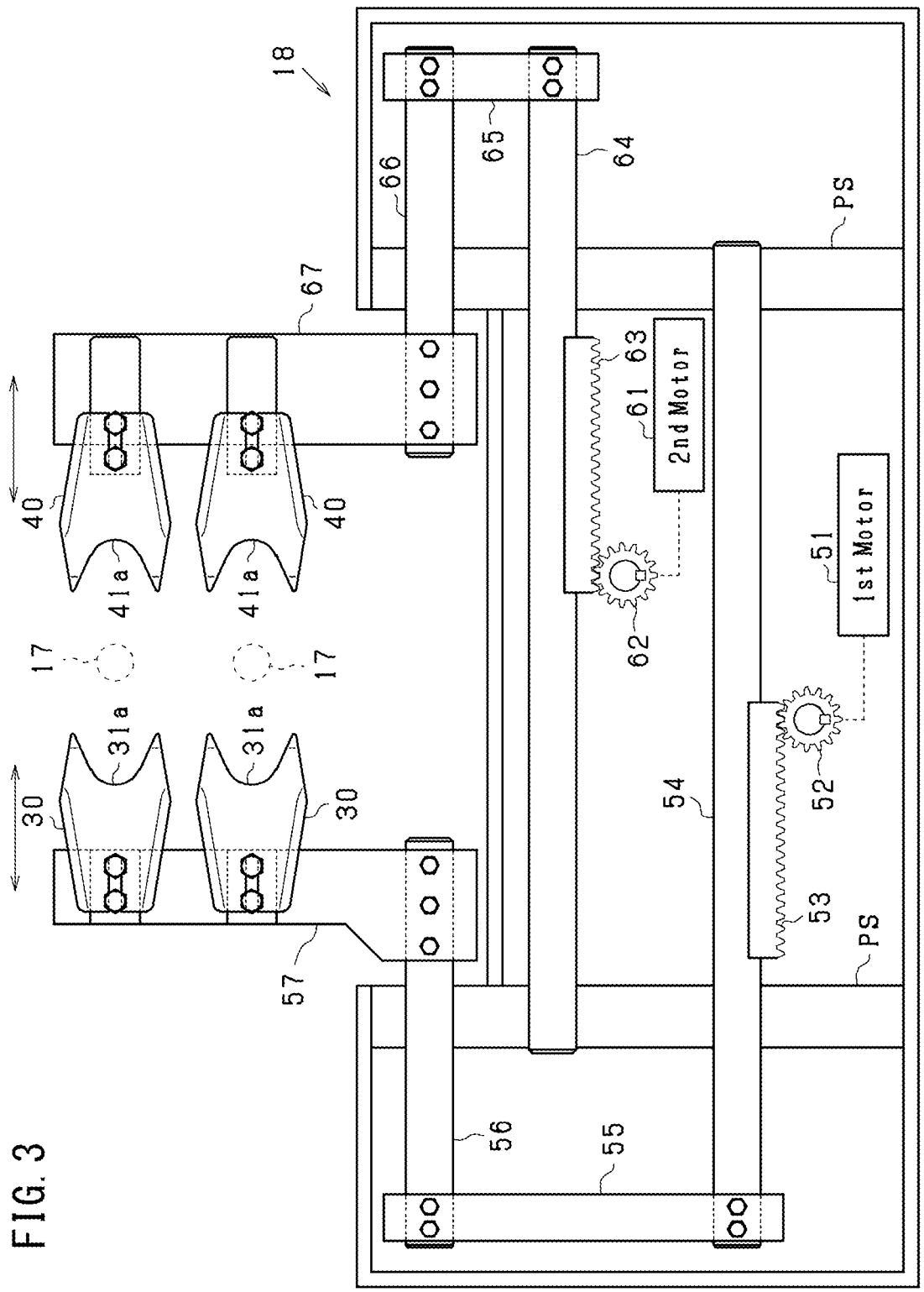
FIG. 3 is a diagram showing a blade drive unit.

Subsequently, the blade drive unit 18 is to be described with reference to FIG. 3.

The blade drive unit 18 includes a first motor 51, a first pinion 52, a first rack 53, a first drive side member 54, and a pedestal portion PS. The first drive side member 54 has an elongated shape. The first drive side member 54 is slidable in a specific direction, and is supported by the pedestal portion PS at two points in the longitudinal direction. Specifically, for example, a bearing hole is formed at the pedestal portion PS, and a bearing that slidably supports the first drive side member 54 is provided in the bearing hole. There is provided a first rack 53 having an elongated shape and extending in the longitudinal direction of the first drive side member 54 at the intermediate part of the first drive side member 54. A plurality of rack teeth are formed at the first rack 53, and the rack teeth are formed in line in the longitudinal direction of the first drive side member 54.

The first motor 51 is, for example, a servomotor and is controlled by the controller 23. A first pinion 52 is fixed to the rotating shaft of the first motor 51. The pinion teeth of the first pinion 52 and the rack teeth of the first rack 53 are in mesh with each other.

The blade drive unit 18 includes a first intermediate member 55, a first blade side member 56, and a first base portion 57. The first intermediate member 55 and the first blade side member 56 have elongated shapes. One end of the first drive side member 54 is fixed to a first end of the first intermediate member 55 in a state in which the first drive side member 54 and the first intermediate member 55 intersect (cross at right angles). A first end of the first blade side member 56 is fixed to a second end of the first intermediate member 55 so that the first drive side member 54 and the first blade side member 56 are in parallel.

The first base portion 57 has an elongated shape. A second end of the first blade side member 56 is fixed to one end of the first base portion 57 in a state of being at right angles to the first blade side member 56. On the upper surface of the first base portion 57, the base end parts of the first shear blades 30 corresponding to respective orifices 17 are fixed in line in the longitudinal direction of the first base portion 57. In this embodiment, the base end part of the first shear blade 30 is fixed to the first base portion 57 by bolts. In this embodiment, the first drive side member 54, the first intermediate member 55, the first blade side member 56, and the first base portion 57 correspond to a "first movable member".

The blade drive unit 18 includes a second motor 61, a second pinion 62, a second rack 63, and a second drive side member 64. The second drive side member 64 has an elongated shape. The second drive side member 64 is slidable in a specific direction, and is supported by the pedestal portion PS at two points in the longitudinal direction. The second drive side member 64 is arranged between the first drive side member 54 and the first blade side member 56 in the direction in which the first shear blades 30 are arranged in line. There is provided a second rack 63 having an elongated shape and extending in the longitudinal direction of the second drive side member 64 at the intermediate part of the second drive side member 64. A plurality of rack teeth are formed at the second rack 63, and the rack teeth are formed in line in the longitudinal direction of the second drive side member 64.

The second motor 61 is, for example, a servomotor and is controlled by the controller 23. A second pinion 62 is fixed to the rotating shaft of the second motor 61. The pinion teeth of the second pinion 62 and the rack teeth of the second rack 63 are in mesh with each other.

The blade drive unit 18 includes a second intermediate member 65, a second blade side member 66, and a second base portion 67. The second intermediate member 65 and the second blade side member 66 have elongated shapes. One end of the second drive side member 64 is fixed to a first end of the second intermediate member 65 in a state in which the second drive side member 64 is at right angles to the second intermediate member 65. A first end of the second blade side member 66 is fixed to a second end of the second intermediate member 65 so that the second drive side member 64 and the second blade side member 66 are in parallel. Here, the second blade side member 66, the second drive side member 64, and the first blade side member 56 are also slidably supported by bearings provided on the pedestal portion PS, similarly to the first drive side member 54.

The second base portion 67 has an elongated shape. A second end of the second blade side member 66 is fixed to one end of the second base portion 67 in a state of being at right angles to the second blade side member 66. On the upper surface of the second base portion 67, the base end parts of the second shear blades 40 corresponding to respective orifices 17 are fixed in line in the longitudinal direction of the second base portion 67. In this embodiment, the base end part of the second shear blade 40 is fixed to the second base portion 67 by bolts. In this embodiment, the second drive side member 64, the second intermediate member 65, the second blade side member 66, and the second base portion 67 correspond to a "second movable member".

When the rotation of the first motor 51 is controlled, the first drive side member 54 provided with rack teeth that mesh with the first pinion 52 reciprocates in a specific direction. This causes each first shear blade 30 to reciprocates in a specific direction. On the other hand, when the rotation of the second motor 61 is controlled, the second drive side member 64 provided with rack teeth that mesh with the second pinion 62 also reciprocates in a specific direction. This causes each second shear blade 40 to reciprocates in the specific direction. The rotations of the first motor 51 and the second motor 61 are controlled in synchronization so that the first and second shear blades 30 and 40 approach each other in the specific direction and the first and second shear blades 30 and 40 separate in the specific direction. In other words, the first and second shear blades 30 and 40 are relatively moved in a common direction.

Subsequently, the first and second shear blades 30 and 40 are to be described with reference to FIGS. 4 and 5.

The first shear blade 30 is a member made of a plate material. The first shear blade 30 is made of, for example, ceramic, titanium, or tungsten.

As shown in FIG. 5, the cross-sectional shape of the tip part of the first shear blade 30 in the length direction is such that it projects upward. This forms a first blade surface 31$b$, which is an inclined surface, at the tip part of the first shear blade 30. The tip of the first blade surface 31$b$ is the first cutting edge 31$a$. In the planar view of the first shear blade 30, the contour of the first cutting edge 31$a$ retracts to the base end side of the first shear blade 30 toward the center in the width direction. As a result, in this embodiment, the contour of the first cutting edge 31$a$ is U-shaped in the planar view of the first shear blade 30.

In the first shear blade 30, there are formed first projecting portions 32 projecting in the length direction of the first shear blade 30 on both sides in the width direction on the side of the first cutting edge 31$a$. Each first projecting portion 32 inclines obliquely downward. The width direction dimensions of the first projecting portion 32 decrease toward the tip in the length direction of the first shear blade 30.

The second shear blade 40 is a member made of a plate material. The second shear blade 40 is made of, for example, ceramic, titanium or tungsten. In this embodiment, the second shear blade 40 is made of the same material as the first shear blade 30. Note that the second shear blade 40 may be made of a material different from that of the first shear blade 30.

As shown in FIG. 5, the cross-sectional shape of the tip part of the second shear blade 40 in the length direction is such that it projects downward. This forms a second blade surface 41b, which is an inclined surface, at the tip part of the second shear blade 40. The tip of the second blade surface 41b is the second cutting edge 41a. In the planar view of the second shear blade 40, the contour of the second cutting edge 41a retracts to the base end side of the second shear blade 40 toward the center in the width direction. As a result, in this embodiment, the contour of the second cutting edge 41a is U-shaped in the planar view of the second shear blade 40. The contours of the second cutting edge 41a and the first cutting edge 31a may be, for example, V-shaped instead of U-shaped.

In the second shear blade 40, there are formed second projecting portions 42 projecting in the length direction of the second shear blade 40 on both sides in the width direction on the side of the second cutting edge 41a. The second projecting portion 42 is inclined diagonally upward. The width direction dimensions of the second projecting portion 42 decrease toward the tip in the length direction of the second shear blade 40.

Each of the first shear blades 30 and the second shear blades 40 has a symmetrical shape with respect to the center in the width direction. Therefore, the contour of the first cutting edge 31a is symmetrical with respect to the center in the width direction. The contour of the second cutting edge 41a is also symmetrical with respect to the center in the width direction. In this embodiment, the first shear blade 30 has the same shape as the second shear blade 40.

The base end parts of the first and second shear blades 30 and 40 are fixed to the first and second base portions 57 and 67 so that the second cutting edge 41a is positioned slightly below the first cutting edge 31a in the vertical direction. This is to cause the tip parts of the first and second shear blades 30 and 40 to overlap while pressing against each other using the elasticity of the shear blades. This prevents a great gap from being formed between the cutting edge sides of the first and second shear blades 30 and 40 to cut the molten glass Gm satisfactorily.

Subsequently, operations of the first shear blade 30 and the second shear blade 40 when cutting the molten glass Gm is to be described.

Figure 4A:
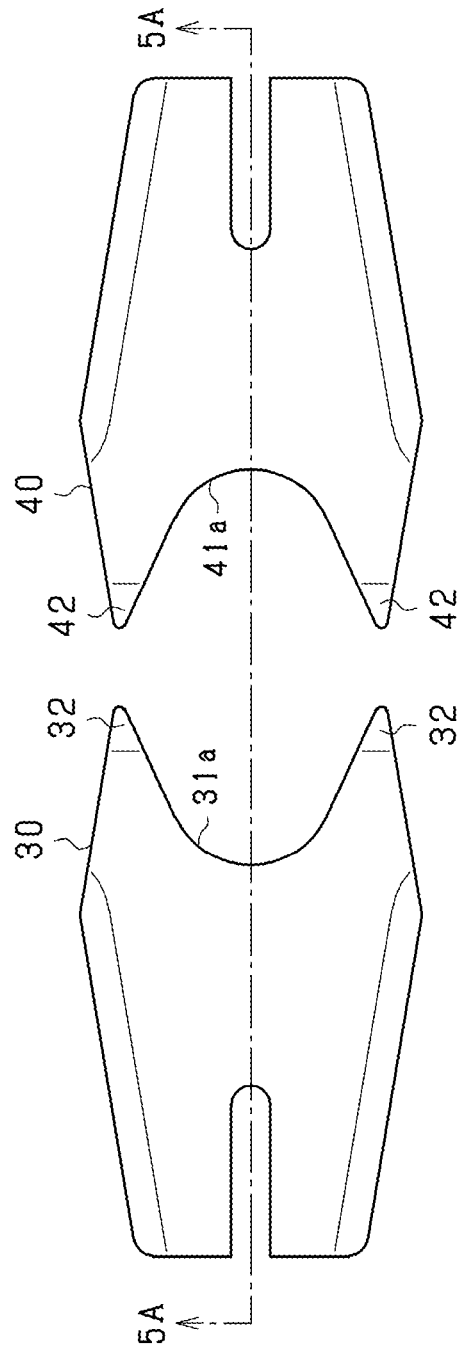
FIG. 4A is a plan view of shear blades separated from each other.

FIGS. 4A and 5A show a state in which the second shear blade 40 and the first shear blade 30 are separated from each other. When the rotations of the first and second motors 51 and 61 are controlled by the controller 23, the first base portion 57 and the second base portion 67 are moved toward each other, so that the first shear blade 30 and the second shear blade 40 are moved toward each other. As a result, the inclined portions of the first and second projecting portions 32 and 42 come into contact with each other. The first and second projecting portions 32 and 42 serve as guides when the tip part of the first shear blades 30 overlaps with that of the second shear blades 40. In this embodiment, the controller 23 controls the rotations of the first motor 51 and the second motor 61 so that the speed at which the first shear blade 30 moves toward the second shear blade 40 is equal to the speed at which the second shear blade 40 moves toward the first shear blade 30.

Figure 4B:
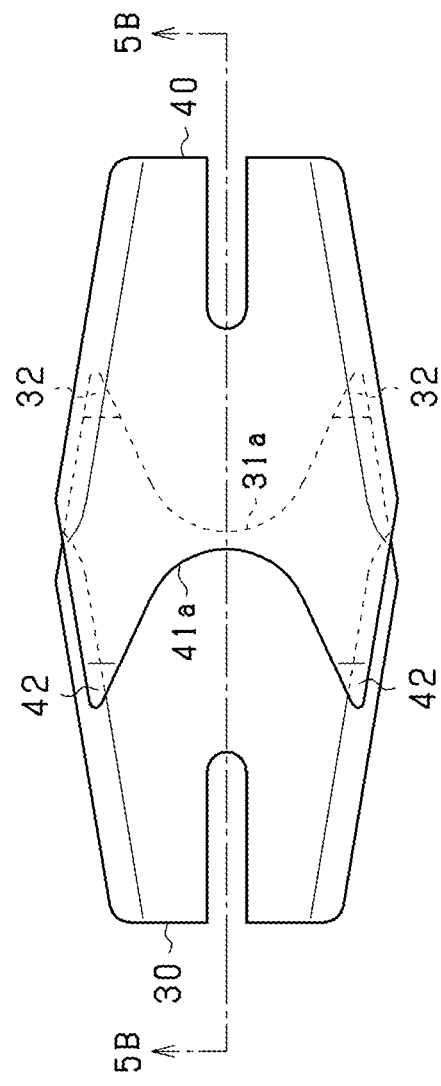
FIG. 4B is a plan view of shear blades whose tip parts overlap.

As shown in FIGS. 4B and 5B, while the lower surface of the second shear blade 40 and the upper surface of the first shear blade 30 are in contact with each other, the tip part of the first shear blade 30 overlaps with the tip part of the second shear blade 40. As a result, the shearing force of the first and second cutting edges 31a and 41a cuts the molten glass Gm extruded from the orifice 17.

Figure 6A:
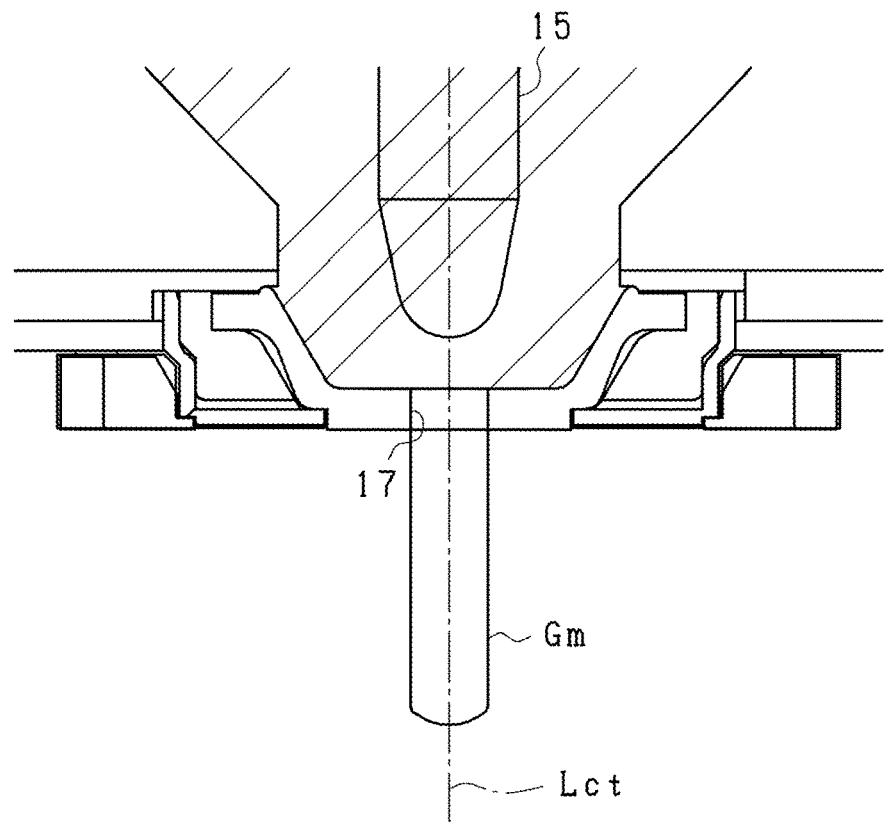
FIG. 6A is a diagram showing a state in which the central position of molten glass aligns with the central axis of the orifice.

In this embodiment, the rotations of the first and second motors 51 and 61 are controlled so that the position of cutting of the molten glass Gm by the first and second cutting edges 31a and 41a is basically set on the central axis Lct of the orifice 17. This control is based on the assumption that the central position of the molten glass Gm extruded from the orifice 17 is on the central axis Lct of the orifice 17, as shown in FIGS. 6A and 7A. When the central position of the molten glass Gm is on the central axis Lct of the orifice 17, as shown in FIG. 7A, a first distance LA, which is the horizontal distance from the center of the first cutting edge 31a in the width direction to the central position of the gob Gb is equal to the second distance LB, which is the horizontal distance from the center of the second cutting edge 41a in the width direction to the central position of the gob Gb. This causes the first and second cutting edges 31a and 41a to come into contact with the molten glass Gm at the same time, as shown by the dashed and double-dotted line in FIG. 7A. In FIG. 7, the total of the first distance LA and the second distance LB is shown as the total distance LT.

Figure 6B:
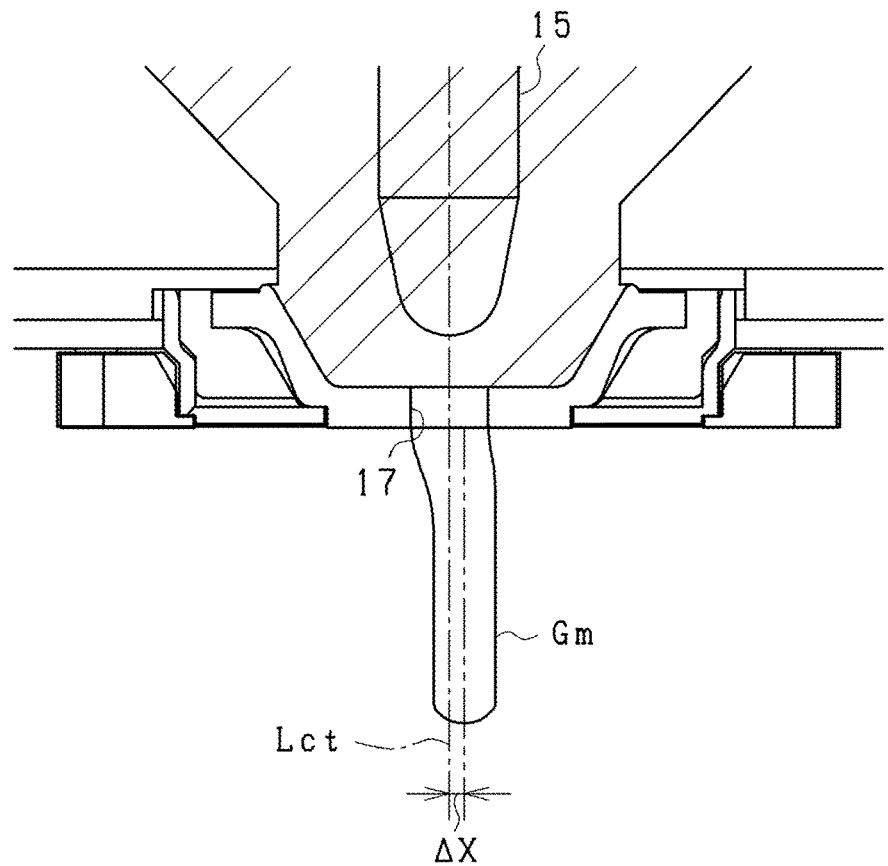
FIG. 6B is a diagram showing a state in which the central position of the molten glass is offset from the central axis of the orifice.

On the other hand, as shown in FIGS. 6B and 7B, the central position of the molten glass Gm may be offset from the central axis Lct. This offset can occur, for example, due to a change in the temperature of the molten glass Gm stored in the spout 11, causing a change in the viscosity of the molten glass Gm. Since the orifice 17 has a circular shape, it is difficult to identify in advance in which direction the molten glass Gm is offset with respect to the central axis Lct. FIGS. 6B and 7B show an example in which the central position of the molten glass Gm is offset from the central axis Lct to the second shear blade 40 side by ΔX in the moving direction (length direction) of the first and second shear blades 30 and 40. In this case, the first distance LA is longer than the second distance LB. As a result, as shown by the dashed and double-dotted line in FIG. 7B, the second cutting edge 41a starts coming into contact with the molten glass Gm at an earlier timing than the first cutting edge 31a. This greatly shakes the molten glass Gm in the moving direction of the second shear blade 40. In this case, there may be a problem in which the cut end of the molten glass Gm does not become a proper cut end for manufacturing a glass product.

In addition, when the molten glass Gm is greatly shaken, there may be a problem in which the drop position of the gob Gb is a position far from the lower opening of the inclined surface 20a of the funnel 20. In this case, the time from when the gob Gb falls on the inclined surface 20a to when it passes through the lower opening can be long. As a result, there may also be a problem in which the gob Gb cannot be supplied from the funnel 20 to the distribution apparatus 21 by the time the gob Gb for the next time is distributed from the distribution device 21 to the mold 22, so that the gob Gb cannot be supplied from the distribution device 21 to each mold 22 at a predetermined cycle.

Figure 8A:
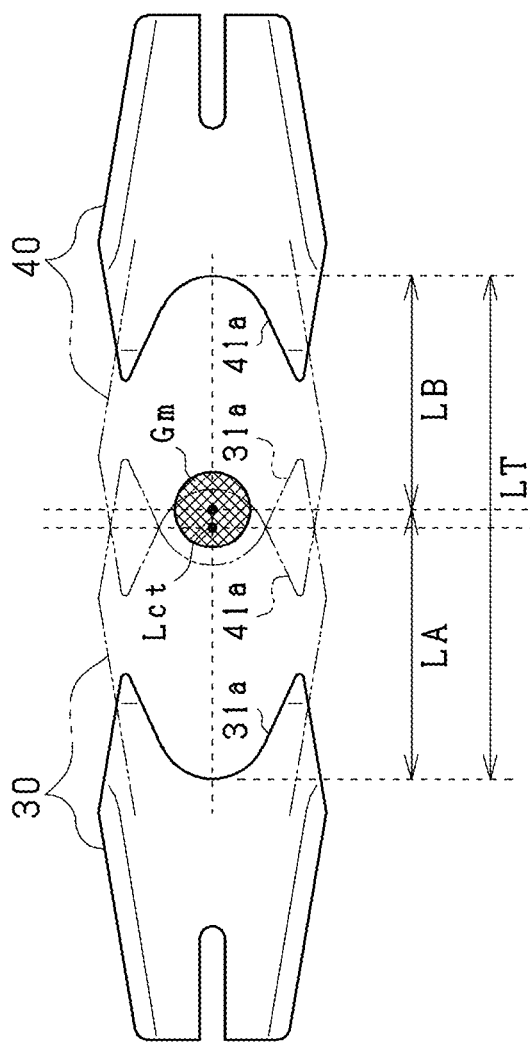
FIG. 8A is a diagram showing that a position where a first and a second cutting edges start overlapping are offset to the central position side of the molten glass with respect to the central axis in the moving direction of the shear blade.
Figure 8B:
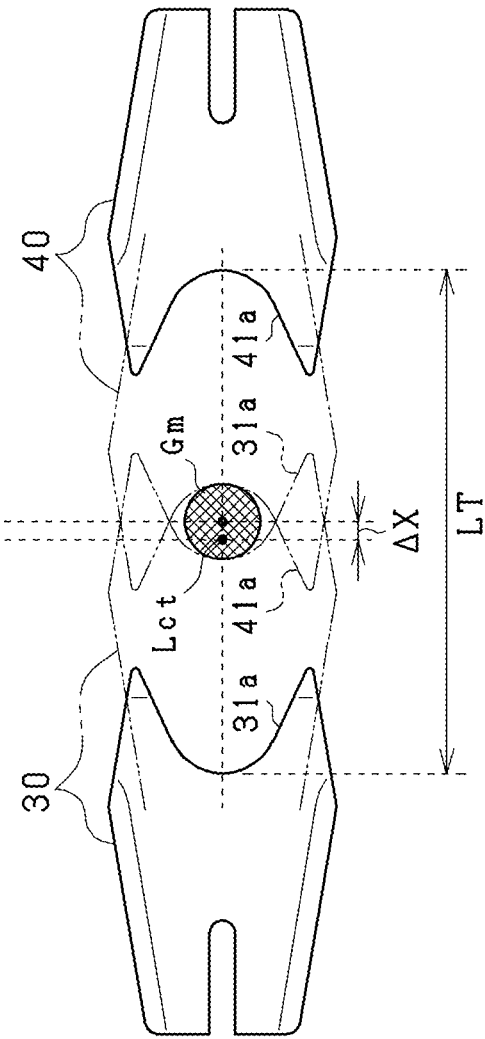
FIG. 8B is a diagram showing that a position where a first and a second cutting edges start overlapping are offset to the central position side of the molten glass with respect to the central axis in the moving direction of the shear blade.

Therefore, in this embodiment, when the central position of the molten glass Gm extruded from the orifice 17 is offset in the length direction of the shear blade with respect to the central axis Lct as shown in FIG. 8A, the controller 23 controls the rotations of the first motor 51 and the second motor 61 so that the position of cutting by the first and second cutting edges 31a and 41a are offset to the central position side of the molten glass Gm with respect to the central axis Lct in the length direction, as shown in FIG. 8B. FIG. 8B shows an example in which the position of cutting by the first and second cutting edges 31a and 41a are offset by an offset amount ΔX with respect to the central axis Lct in the length direction to the central position side of the gob Gb. The controller 23 uses the offset amount ΔX input by the operator to the input unit 24. The offset amount ΔX is measured, for example, visually by the operator. As shown by the dashed and double-dotted line in FIG. 8B, offsetting the position of cutting causes the first and second cutting edges 31a and 41a to come into contact with the molten glass Gm at the same time.

Note that the central position of the gob Gb may be offset in the width direction of the shear blade with respect to the central axis Lct as well as in the length direction of the shear blade with respect to the central axis Lct. However, since the contours of the first and second cutting edges 31a and 41a retract to the base end side of the shear blade toward the center in the width direction of the shear blade, when the molten glass Gm is sandwiched between the first and second cutting edges 31a and 41a, the central position of the sandwiched molten glass Gm is offset to the center side in the width direction. Therefore, even when the central position of the molten glass Gm extruded from the orifice 17 is offset in the width direction of the shear blade with respect to the central axis Lct, the drop position of the gob Gb on the funnel 20 is not significantly offset in the width direction of the shear blade with respect to the central axis Lct.

According to this embodiment described above, it is possible to prevent the molten glass Gm from being greatly shaken in the length direction of the shear blade. This can prevent a problem in which the cut end of the molten glass Gm is not a proper cut end for manufacturing glass products, or the drop position of the gob Gb greatly deviate from the central axis Lct. In other words, the molten glass Gm can be cut satisfactorily.

Since the drop position of the gob Gb does not deviate significantly from the central axis Lct, it is possible to prevent a case in which the drop position of the gob Gb on the inclined surface 20a of the funnel 20 is located away from the lower opening. This can prevent the gob Gb from being unable to be supplied from the distribution apparatus 21 to each mold 22 at a predetermined cycle.

Second Embodiment

Figure 9:
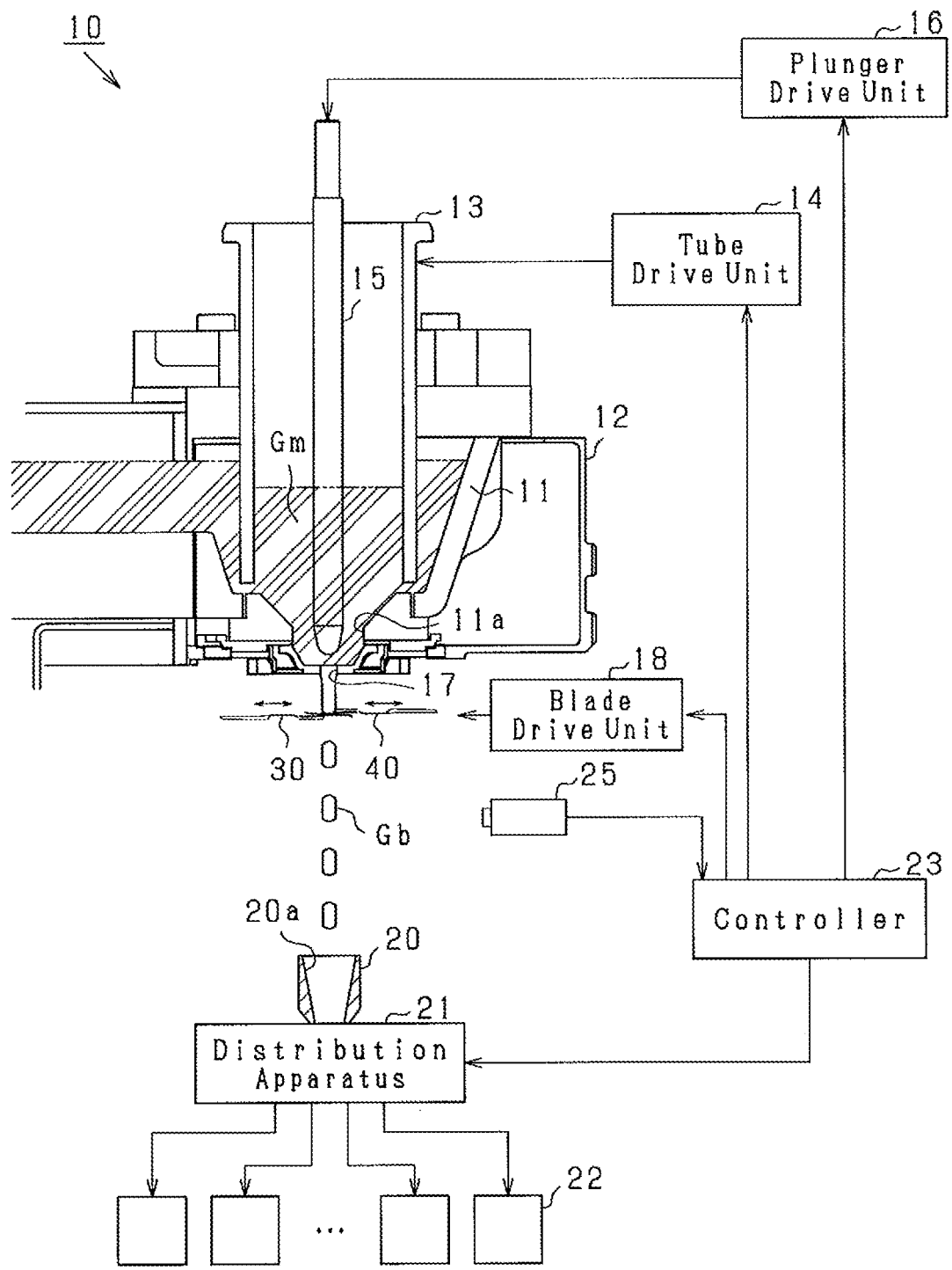
FIG. 9 is an overall configuration diagram of a glass container manufacturing apparatus according to a second embodiment.

A second embodiment is to be described below with reference to the drawings, focusing on differences from the first embodiment. In this embodiment, the controller 23 calculates the offset amount ΔX based on the imaging data of the camera 25 shown in FIG. 9. Note that, in FIG. 9, some of the same configurations as, or the corresponding configurations to those described in the first embodiment are designated by the same reference numerals for convenience.

The camera 25 as an imaging unit images the molten glass at a predetermined position between being extruded from the orifice 17 and reaching the funnel 20, and specifically, the camera is, for example, an infrared camera or a CCD camera. For example, the camera 25 is arranged so that the molten glass Gm extruded from the orifice 17 can be imaged in the state before being cut by the first and second cutting edges 31a and 41a. In addition, for example, the camera 25 is arranged so that the gob Gb can be imaged at a predetermined position on the path from being cut by the first and second cutting edges 31a and 41a to falling onto the funnel 20. Furthermore, for example, the camera 25 is arranged so that the inclined surface 20a of the funnel 20 can be imaged. One or more cameras 25 are arranged. The imaging data of the camera 25 is input to the controller 23.

The controller 23 calculates the offset amount ΔX of the central position of the molten glass Gm with respect to the central axis Lct of the orifice 17 based on the image processing result of the imaging data. The offset amount ΔX can be calculated based on the image processing result because the offset amount ΔX correlates with the shape of the molten glass Gm identified based on the image processing result, or with the shape and attitude of the gob Gb identified based on the image processing result. The controller 23 includes a storage unit (specifically, a memory) in which there is stored data of an offset amount ΔX associated with the shape of the molten glass Gm or the shape and attitude of the gob Gb. The controller 23 calculates the offset amount ΔX based on the shape of the molten glass Gm or the shape and attitude of the gob Gb identified based on the image processing result, and the data stored in the storage unit.

Specifically, for example, the controller 23 identifies the shape of the molten glass Gm hanging downward from the orifice 17 based on the image processing result of the imaging data of the molten glass Gm in the state before being cut by the first and second cutting edges 31a and 41a. The controller 23 calculates the offset amount ΔX based on the identified shape and the data stored in the storage unit.

In addition, for example, the controller 23 identifies at least one of the shape and the attitude of the gob Gb based on the image processing result of the imaging data of the gob Gb in the middle of falling. The controller 23 calculates the offset amount ΔX based on at least one of the identified shape and attitude and the data stored in the storage unit. In this case, the controller 23 may make the offset amount ΔX greater, for example, as the attitude of the rod-shaped or columnar gob Gb is inclined more with respect to the vertical direction.

Furthermore, for example, the controller 23 identifies the drop position of the gob Gb on the inclined surface 20a based on the image processing result of the imaging data of the gob Gb on the inclined surface 20a of the funnel 20. The controller 23 calculates the offset amount ΔX based on the identified drop position and the data stored in the storage unit. Incidentally, when the controller 23 determines that the gob Gb has passed through the lower opening of the funnel 20 without falling on the inclined surface 20a based on the imaging data of the gob Gb on the inclined surface 20a, the controller 23 may determine the above offset amount ΔX to be zero.

The controller 23 can also calculate the offset amount ΔX by the method to be described below. For example, the controller 23 identifies the shape of the molten glass Cm hanging downward from the orifice 17 based on the image processing result of the imaging data of the molten glass Gm in the state before being cut by the first and second cutting edges 31a and 41a, and calculates the position of the center of gravity of the molten glass Gm based on the identified shape. The controller 23 determines the calculated position of the center of gravity to be the center position of the molten glass Gm extruded from the orifice 17, and calculates the distance between the center position and the central axis Lct in the length direction of the shear blade as the offset amount ΔX.

In addition, for example, the controller 23 identifies the shape of the gob Gb based on the image processing result of the imaging data of the gob Gb in the middle of falling, and calculates the position of the center of gravity of the gob Gb based on the identified shape. The controller 23 determines the calculated position of the center of gravity to be the center position of the molten glass Gm extruded from the orifice 17, and calculates the distance between the center position and the central axis Lct in the length direction of the shear blade as the offset amount $\Delta X$.

Furthermore, for example, the controller 23 identifies the drop position of the gob Gb on the inclined surface 20a based on the image processing result of the imaging data of the gob Gb on the inclined surface 20a of the funnel 20. The controller 23 determines the identified drop position to be the center position of the molten glass Gm extruded from the orifice 17, and calculates the distance between the center position and the central axis Lct in the length direction of the shear blade as the offset amount $\Delta X$.

The controller 23 controls the rotations of the first and second motors 51 and 61 to correct the position of cutting of the molten glass Gm by the first and second cutting edges 31a and 41a to a position offset by the calculated offset amount $\Delta X$ with respect to the central axis Lct in the length direction.

Figure 10:
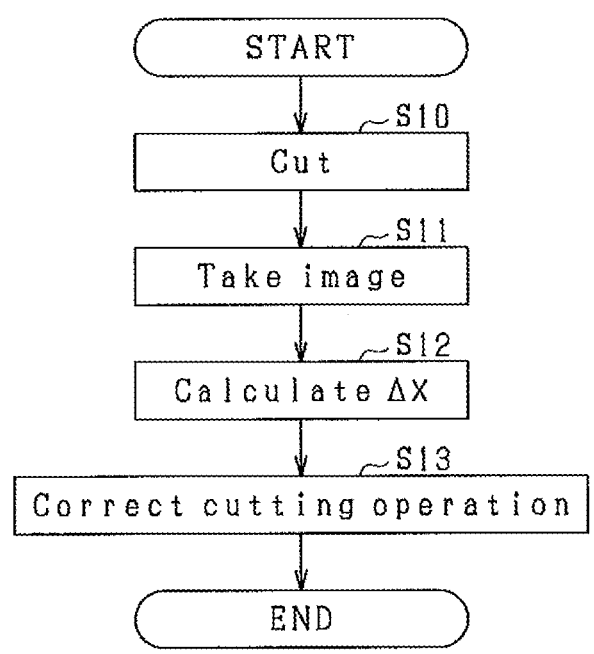
FIG. 10 is a flowchart showing a cutting process of molten glass.

FIG. 10 is a flowchart showing a procedure of processing executed by the controller 23.

In step S10, the rotations of the first and second motors 51 and 61 are controlled to move the first and second shear blades 30 and 40 toward each other.

In step S11, the camera 25 is instructed to image the molten glass at a predetermined position between being extruded from the orifice 17 and reaching the funnel 20. Here, the imaging by the camera 25 is implemented in the above-described manner.

In step S12, image processing is performed on the input imaging data of the camera 25 to calculate the offset amount $\Delta X$.

In step S13, the rotations of the first and second motors 51 and 61 are controlled so that the position of cutting of the molten glass Gm by the first and second cutting edges 31a and 41a is corrected to a position offset by the calculated offset amount $\Delta X$ with respect to the central axis Lct in the length direction. Incidentally, a method may be used in which the position of cutting is offset only when the offset amount $\Delta X$ exceeds an allowable value, and the position of cutting is not offset when the offset amount $\Delta X$ is equal to or less than the allowable value.

According to this embodiment described above, when the central position of the molten glass Gm is offset with respect to the central axis Lct, the position of cutting by the first and second cutting edges 31a and 41a can be automatically offset. This can reduce the workload of the operator. Furthermore, since the offset amount $\Delta X$ is calculated based on the imaging data of the camera 25, the calculation accuracy of the offset amount $\Delta X$ can be improved as compared with the case in which the offset amount is visually taken by the operator, for example.

Incidentally, the offset amount may be different for each orifice 17. In this case, in step S12, the controller 23 calculates the offset amounts $\Delta X1$ and $\Delta X2$ of the central position of the molten glass Gm with respect to the central axis Lct in the length direction of the shear blade for each orifice 17. The controller 23 calculates the intermediate value of each of the calculated offset amounts $\Delta X1$ and $\Delta X2$ as the command offset amount. The command offset amount is, for example, the median $(=(\Delta X1+\Delta X2)/2)$ of the respective offset amounts $\Delta X1$ and $\Delta X2$. The command offset amount is not limited to the median, and may be a value deviated from the median as long as it is between one offset amount $\Delta X1$ and the other offset amount $\Delta X2$. In step S13, the controller 23 controls the rotations of the first and second motors 51 and 61 to correct the position of cutting by the first and second cutting edges 31a and 41a to a position offset with respect to the central axis Lct by the calculated command offset amount.

Third Embodiment

Figure 11:
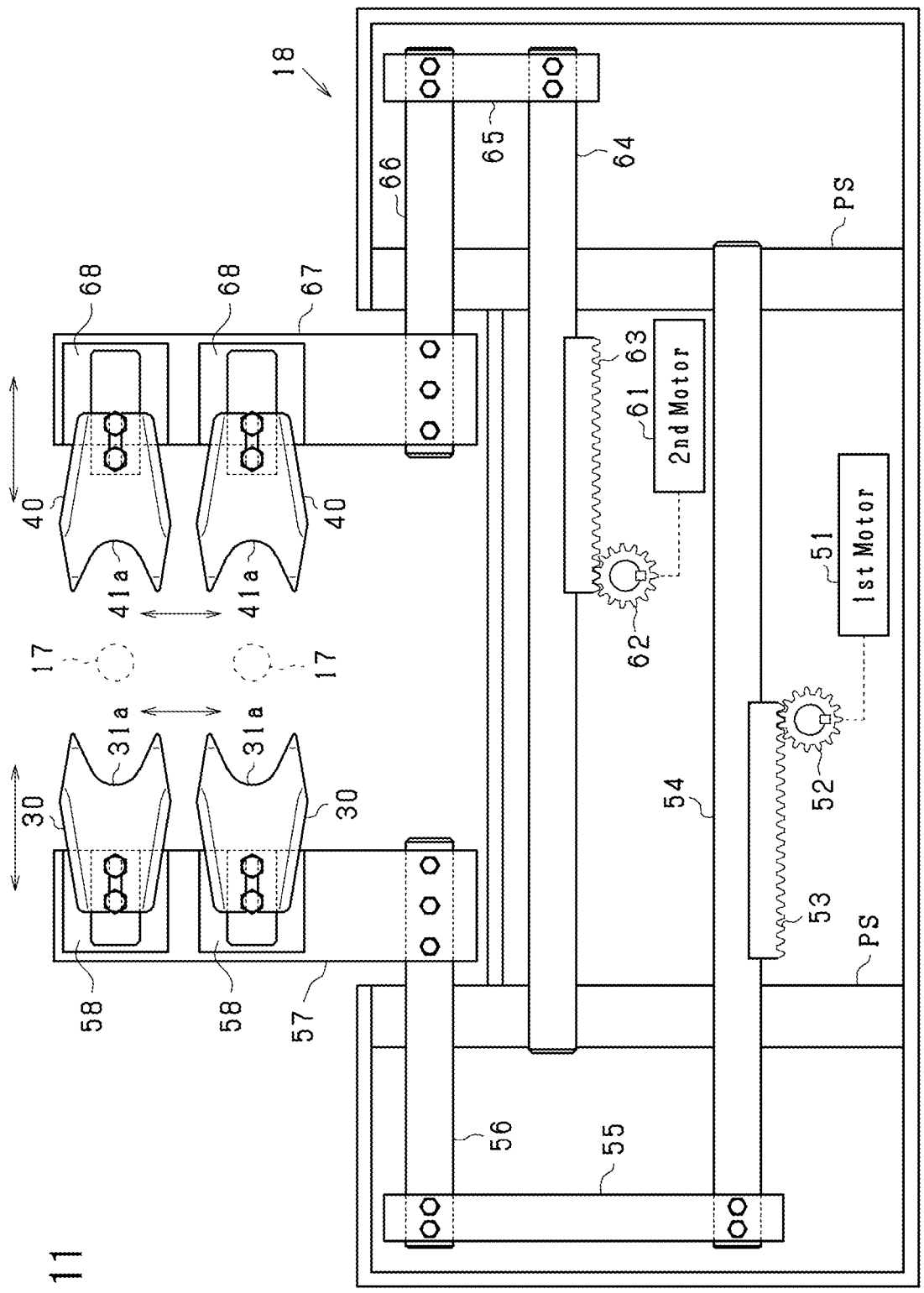
FIG. 11 is a diagram showing a blade drive unit according to a third embodiment.

A third embodiment is to be described below with reference to the drawings, focusing on the differences from the second embodiment. In this embodiment, there is used a configuration such that the molten glass Gm could be cut satisfactorily if there is an offset of the molten glass Gm of the shear blade with respect to the central axis Lct in the width direction in addition to the offset thereof in the length direction. An example of the configuration is shown in FIG. 11. Note that, in FIG. 11, some of the same configurations as, or the corresponding configurations to those shown in FIG. 3 above are designated by the same reference numerals for convenience.

The blade drive unit 18 includes first slide portions 58 each corresponding to each of the first shear blades 30. A base end part of each first shear blade 30 is fixed to each first slide portion 58. Each of the first slide portions 58 is supported by the first base portion 57 so as to be slidable in a direction orthogonal to the moving direction of the first base portion 57 in the horizontal direction. As a result, each of the first shear blades 30 can individually move in the width direction.

The blade drive unit 18 includes second slide portions 68 each corresponding to each of the second shear blades 40. A base end part of each second shear blade 40 is fixed to each second slide portion 68. Each of the second slide portions 68 is supported by the second base portion 67 so as to be slidable in a direction orthogonal to the moving direction of the second base portion 67 in the horizontal direction. As a result, each of the second shear blades 40 can individually move in the width direction. In other words, in this embodiment, the amount of movement in the width direction can be individually adjusted for each of the two sets of the first and second shear blades 30 and 40. The slides of the first slide portion 58 and the second slide portion 68 are controlled by the controller 23.

Figure 12A:
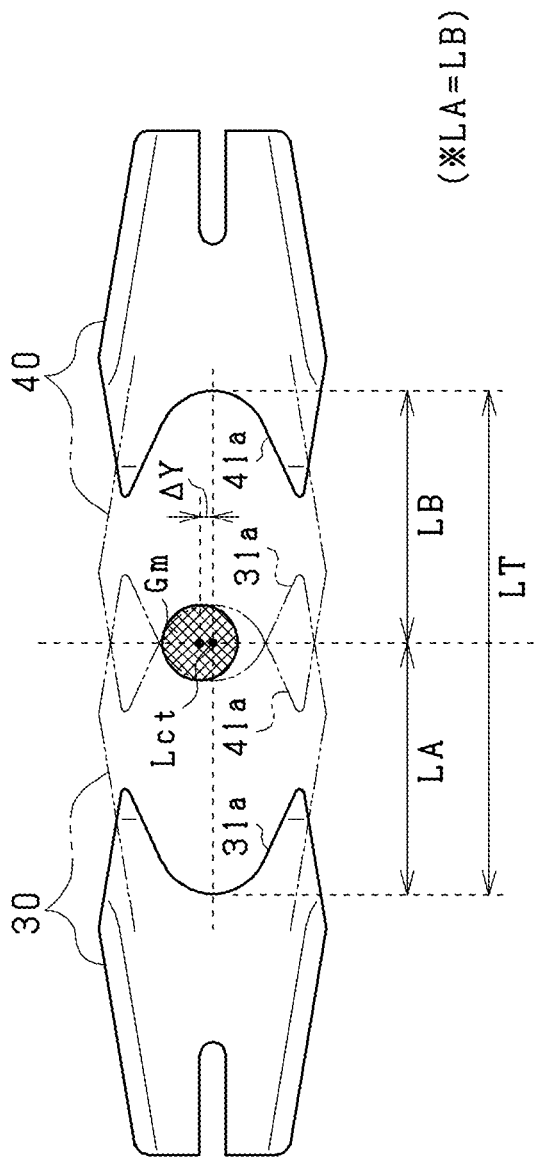
FIG. 12A is a diagram showing that a position where a first and a second cutting edges start overlapping are offset to the central position side of the molten glass with respect to the central axis in the width direction of the shear blade.
Figure 12B:
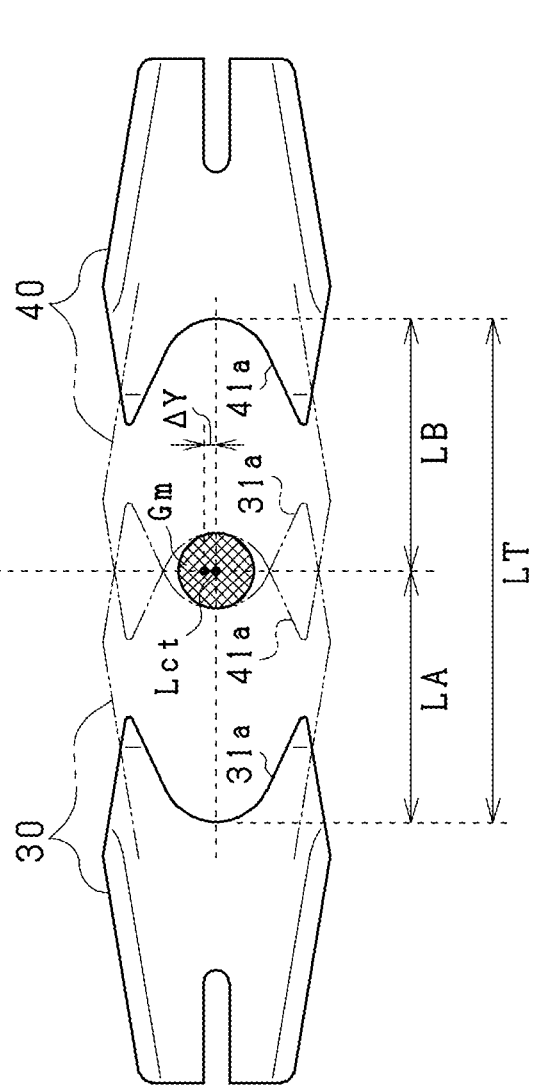
FIG. 12B is a diagram showing that a position where a first and a second cutting edges start overlapping are offset to the central position side of the molten glass with respect to the central axis in the width direction of the shear blade.

As shown in FIG. 12A, the central position of the molten glass Gm extruded from the orifice 17 may be offset from the central axis Lct in the width direction of the shear blade. Therefore, in this embodiment, as shown in FIG. 12B, the controller 23 offsets the position of cutting by the first and second cutting edges 31a and 41a by an offset amount $\Delta Y$ to the central position side of the molten glass Gm with respect to the central axis Lct in the width direction. This causes the first and second cutting edges 31a and 41a to come into contact with the molten glass Gm at the same time, as shown by the dashed and double-dotted line in FIG. 12B. Note that FIG. 12 shows a case in which the offset amount $\Delta X$ in the length direction is zero for convenience.

Figure 13:
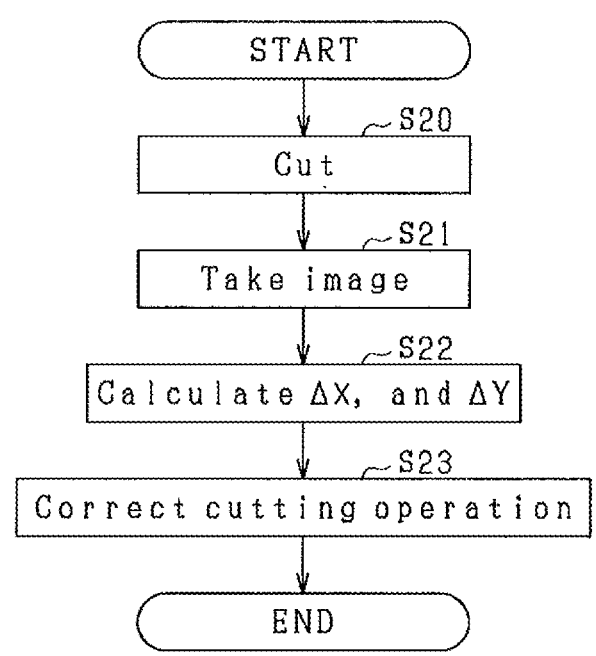
FIG. 13 is a flowchart showing a cutting process of molten glass.

FIG. 13 is a flowchart showing a procedure of processing executed by the controller 23.

In step S20, the rotations of the first and second motors 51 and 61 are controlled to move the first and second shear blades 30 and 40 toward each other.

In step S21, the camera 25 is instructed to image the molten glass at a predetermined position between being extruded from the orifice 17 and reaching the funnel 20.

In step S22, image processing is performed on the imaging data of the camera 25 to calculate the offset amount ΔX of the center position of the molten glass Gm with respect to the central axis Lct in the length direction of the shear blade and the offset amount ΔY of the center position of the molten glass Gm with respect to the central axis Lct in the width direction of the shear blade. Specifically, the offset amount ΔX in the length direction and the offset amount ΔY in the width direction are calculated individually for each of the two sets of shear blades 30 and 40. Here, the offset amount ΔY in the width direction may be calculated by the same method as the method for calculating the offset amount ΔX in the length direction described in the second embodiment.

In step S23, control is performed on the rotations of the first and second motors 51 and 61, the slides of the first slide portions 58, and the slides of the second slide portions 68, to individually correct the positions of cuttings by the first and second cutting edges 31a and 41a of the two sets of shear blades 30 and 40: each to a position offset by the calculated offset amount ΔX with respect to the central axis Lct in the length direction; and each to a position offset by the calculated offset amount ΔY with respect to the central axis Lct in the width direction.

According to this embodiment described above, for each of the two sets of shear blades 30 and 40, if the center position of the molten glass Gm is offset in the width direction with respect to the central axis Lct, the influence of the offset could be reduced or eliminated.

Other Embodiments

Each of the above embodiments may be modified for implementation as follows.

The method of calculating the offset amount is not limited to the method illustrated in the second and third embodiments. For example, the controller 23 may calculate the offset amount each time a predetermined period elapses, based on a plurality of imaging data over a predetermined period of time including a plurality of cutting operations, without calculating the offset amount each time the cutting operation by the first and second cutting edges 31a and 41a is performed. This method is effective, for example, when the offset amount of the molten glass does not increase in a short time.

In the second and third embodiments, the data to be used for calculating the offset amounts ΔX and ΔY is not limited to the imaging data of the camera 25. For example, when the molten glass cutting apparatus includes a laser sensor capable of irradiating the molten glass Gm or gob Gb extruded from the orifice 17 with a laser, the controller 23 may calculate the offset amounts ΔX and ΔY based on the detection data of the laser sensor.

In the second embodiment, the controller 23 may control the rotations of the first and second motors 51 and 61 so that the current offset amount of the position of cutting in the length direction of the shear blade gradually approaches the offset amount ΔX calculated in step S12 of FIG. 10. In this case, for example, even when the calculated offset amount ΔX temporarily becomes excessively great, it is possible to prevent the actual offset amount from becoming excessively great following the calculated offset amount ΔX.

In the third embodiment, the controller 23 may control the slides of the first and second slide portions 58 and 68 so that the current offset amount of the position of cutting in the width direction of the shear blade gradually approaches the offset amount ΔY calculated in step S22 of FIG. 13.

In the third embodiment, of the offset in the length direction and the offset in the width direction of the shear blade, only the offset in the width direction may be corrected.

In the first and second embodiments, a common value is used as the offset amount of the position of cutting in each of the two sets of the first and second shear blades 30 and 40, but the present invention is not limited to this. When the molten glass cutting apparatus includes a blade drive unit 18 in which the offset amounts can be individually adjusted for each of two sets of the first and second shear blades 30 and 40, the individual offset amounts may be used for each of two sets of the first and second shear blades 30 and 40.

The invention claimed is:

1. A molten glass cutting apparatus comprising:
a first shear blade that includes a first cutting edge;
a second shear blade that includes a second cutting edge; and
a control unit that controls the first shear blade and the second shear blade to relatively move toward each other,
wherein the first shear blade and the second shear blade are disposed below a spout that stores molten glass and has an orifice at a bottom of the spout, and above a funnel, and
the control unit controls the first shear blade and the second shear blade to relatively move until, the first cutting edge and the second cutting edge are at a cutting position at which the first cutting edge and the second cutting edge cut a portion of a molten glass extruded from the orifice; and
the control unit is configured such that when a center of the portion of the molten glass at a predetermined position between the orifice and the funnel is offset in a moving direction at least one of the first shear blade and the second shear blade with respect to a central axis of the orifice, the control unit calculates an offset amount of the center with respect to the central axis, and offsets, the first cutting edge and the second cutting edge by the offset amount in the moving direction with respect to the central axis to align the cutting position with the center.

2. The molten glass cutting apparatus according to claim 1, wherein
the first cutting edge and the second cutting edge are concave, and
the first cutting edge and the second cutting edge are opposite each other with a center of the first cutting edge in a width direction of the first shear blade and a center of the second cutting edge in a width direction of the second shear blade being farthest away from each other.

3. The molten glass cutting apparatus according to claim 1, further comprising
an imaging unit that captures an image of the portion of the molten glass at the predetermined position between the orifice and the funnel,
wherein the control unit calculates the offset amount based the image of the portion of the molten glass.

4. The molten glass cutting apparatus according to claim 1, further comprising:
a first movable member attached to the first shear blade;
a second movable member attached to the second shear blade;

a first motor that reciprocates the first movable member in a specific direction; and a second motor that reciprocates the second movable member in the specific direction, wherein the first shear blade includes a first base end that is opposite from the first cutting edge and attached to the first movable member, the second shear blade includes a second base end that is opposite from the second cutting edge and attached to the second movable member, and the control unit controls the first motor and the second motor to relatively move the first movable member and the second movable member until the first cutting edge and the second cutting edge are at the cutting position.

5. A glass product manufacturing apparatus for manufacturing glass products using gobs that are cutouts of molten glass, the glass product manufacturing apparatus comprising:

the molten glass cutting apparatus according to claim 1;

the spout;

the funnel that has a through hole that extends in the vertical direction, and an inner peripheral surface that defines the through hole and slopes downward-slope; and a distribution apparatus that is disposed below the funnel and sequentially distributes the gobs that fall from a lower opening of the through hole to molds, respectively, to manufacture the glass products at a predetermined cycle.

6. A molten glass cutting apparatus comprising:

a first shear blade that includes a first cutting edge and a first base end that is opposite from the first cutting edge;

a second shear blade that includes a second cutting edge and a second base end that is opposite from the second cutting edge;

a third shear blade that includes a third cutting edge and a third base end that is opposite from the third cutting edge;

a fourth shear blade that includes a fourth cutting edge and a fourth base end that is opposite from the fourth cutting edge:

a first movable member to which the first base end and the third base end are attached;

a second movable member to which the second base end and the fourth base end are attached; and a control unit that controls the first shear blade and the second shear blade to relatively move toward each other, and the third shear blade and the fourth shear blade to relatively move toward each other, wherein the first shear blade, the second shear blade, the third shear blade, and the fourth shear blade are disposed below a spout that stores molten glass and has a first orifice and a second orifice at a bottom of the spout, and above a first funnel and a second funnel, and the control unit controls the first movable member and the second movable member to relatively move the first shear blade and the second shear blade until the first cutting edge and the second cutting edge are at a first cutting position at which the first cutting edge and the second cutting edge cut a first portion of a molten glass extruded from the first orifice, and to relatively move the third shear blade and the fourth shear blade until the third cutting edge and the fourth cutting edge are at a second cutting position at which the third cutting edge and the fourth cutting edge cut a second portion of a molten glass extruded from the second orifice; and the control unit is configured such that when at least one of a center of the first portion of the molten glass at a first predetermined position between the first orifice and the first funnel and a center of the second portion of the molten glass at a second predetermined position between the second orifice and the second funnel is offset with respect to a central axis of a corresponding one of the first orifice and the second orifice, the control unit calculates an offset amount of the at least one of the center of the first portion and the center of the second portion with respect to the central axis, and controls the first movable member and the second movable member to offset the first cutting edge, the second cutting edge, the third cutting edge, and the fourth cutting edge by the offset amount with respect to the central axis to align the first cutting position with the center of the first portion and the second cutting position with the center of the second portion.

7. The molten glass cutting apparatus according to claim 6, further comprising an imaging unit that captures an image of at least one of the first portion and the second portion of the molten glass at a predetermined position between the orifice and the funnel, wherein the control unit calculates the offset amount based on the image of the at least one of the first portion and the second portion of the molten glass.

8. The molten glass cutting apparatus according to claim 6, wherein the first cutting edge, the second cutting edge, the third cutting edge, and the fourth cutting edge are concave, the first cutting edge and the second cutting edge are opposite each other with a center of the first cutting edge in a width direction of the first shear blade and a center of the second cutting edge in a width direction of the second shear blade being farthest away from each other, and the third cutting edge and the fourth cutting edge are opposite each other with a center of the third cutting edge in a width direction of the third shear blade and a center of the fourth cutting edge in a width direction of the fourth shear blade being farthest away from each other.

9. The molten glass cutting apparatus according to claim 6, comprising:

a first movable member attached to the first shear blade and the third shear blade;

a second movable member attached to the second shear blade and the fourth shear blade;

a first motor that reciprocates the first movable member in a specific direction; and a second motor that reciprocates the second movable member in the specific direction, wherein the first shear blade includes a first base end that is opposite from the first cutting edge and attached to the first movable member, the second shear blade includes a second base end that is opposite from the second cutting edge and attached to the second movable member, the third shear blade includes a third base end that is opposite from the third cutting edge and attached to the first movable member, the fourth shear blade includes a fourth base end that is opposite from the fourth cutting edge and attached to the second movable member, the control unit controls the first motor and the second motor to relatively move the first movable member and the second movable member until the first cutting edge and the second cutting edge are at the first cutting position, and the third cutting edge and the fourth cutting edge are at the second cutting position.

10. A glass product manufacturing apparatus for manufacturing glass products using gobs that are cutouts of molten glass, the glass product manufacturing apparatus comprising:

the molten glass cutting apparatus according to claim 6;

the spout;

the first funnel that has a first through hole that extends in the vertical direction and a first inner peripheral surface that defines the first through hole and slopes downward-slope;

the second funnel has a second through hole that extends in the vertical direction and a second inner peripheral surface that defines the second through hole and slopes downward; and a distribution apparatus that is disposed below the first funnel and the second funnel and sequentially distributes gobs that fall from lower openings of the first through hole and the second through hole to molds, respectively, to manufacture the glass products at a predetermined cycle.

11. A molten glass cutting apparatus comprising:

a first shear blade that includes a first cutting edge that is concave;

a second shear blade that includes a second cutting edge that is concave;

the first shear blade and the second shear blade are disposed below a spout that stores molten glass and has an orifice at a bottom of the spout, and above a funnel; and a control unit that controls the first shear blade and the second shear blade to relatively move toward each other until the first cutting edge and the second cutting edge are at a cutting position at which the first cutting edge and the second cutting edge cut a portion of the molten glass extruded from the orifice, wherein the first cutting edge and the second cutting edge are opposite each other with a center of the first cutting edge in a width direction of the first shear blade and a center of the second cutting edge in a width direction of the second shear blade being farthest away from each other, and wherein the control unit is configured such that when a center of the portion of the molten glass at a predetermined position between the orifice and the funnel is offset in a moving direction of at least one of the first shear blade and the second shear blade with respect to a central axis of the orifice, the control unit calculates an offset amount of the center.

12. The molten glass cutting apparatus according to claim 11, further comprising an imaging unit that captures an image of the portion of the molten glass at the predetermined position between the orifice and the funnel, wherein the control unit calculates the offset amount based on the image of the portion of the molten glass.

13. The molten glass cutting apparatus according to claim 11, further comprising:

a first movable member attached to the first shear blade;

a second movable member attached to the second shear blade;

a first motor that reciprocates the first movable member in a specific direction; and a second motor that reciprocates the second movable member in the specific direction, wherein the first shear blade includes a first base end that is opposite from the first cutting edge and attached to the first movable member, the second shear blade includes a second base end that is opposite from the second cutting edge and attached to the second movable member, and the control unit controls the first motor and the second motor to relatively move the first shear blade and the second shear blade toward each other.

\* \* \* \* \*